July 8, 1958
E. J. DIEBOLD
2,842,722
RECTIFIER MOUNTING DEVICE
Filed March 4, 1957
3 Sheets-Sheet 1
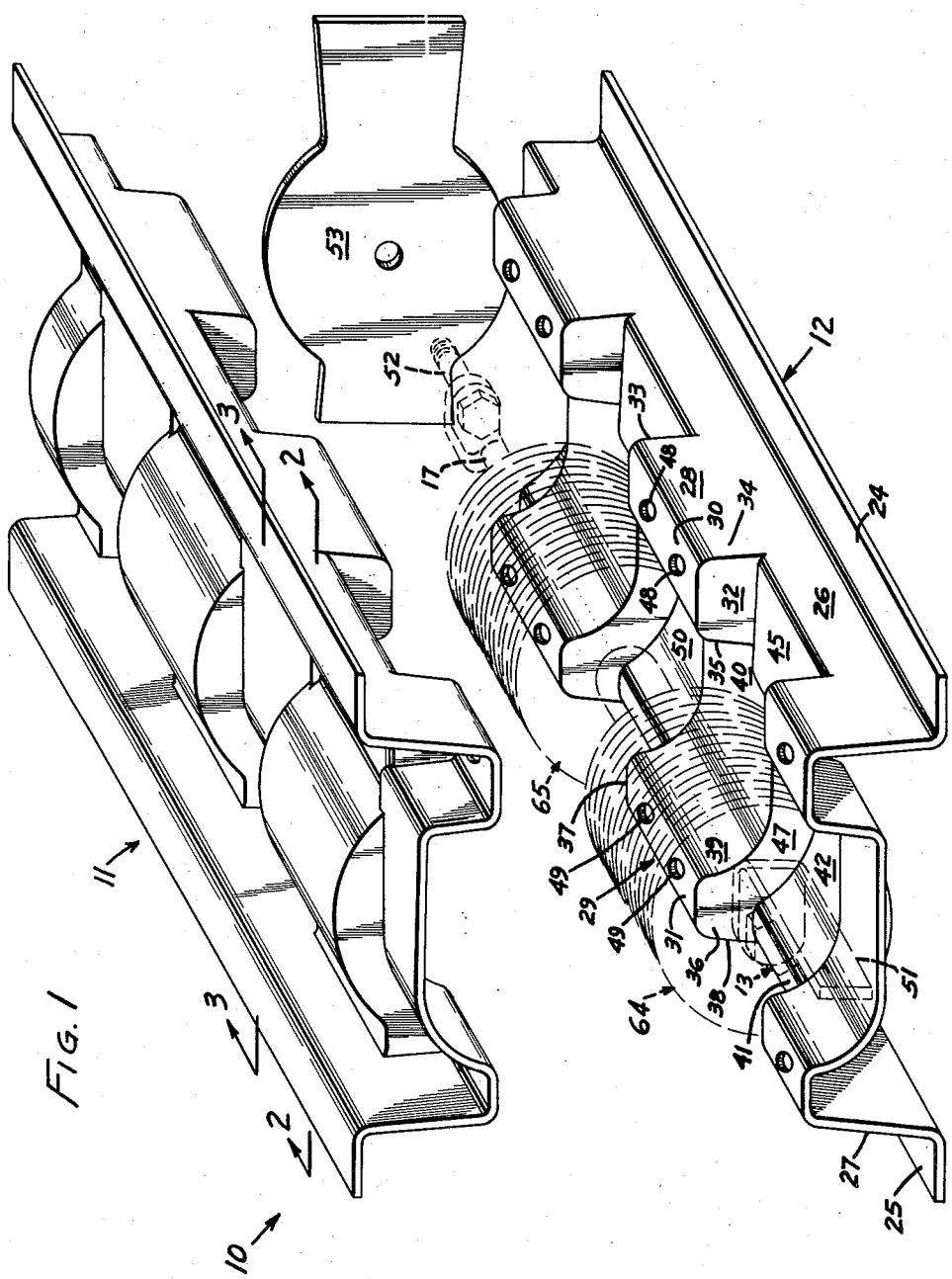
INVENTOR.
EDWARD J. DIEBOLD
BY D. Gordon Angus
ATTORNEY.

July 8, 1958   E. J. DIEBOLD   2,842,722
RECTIFIER MOUNTING DEVICE
Filed March 4, 1957   3 Sheets-Sheet 2
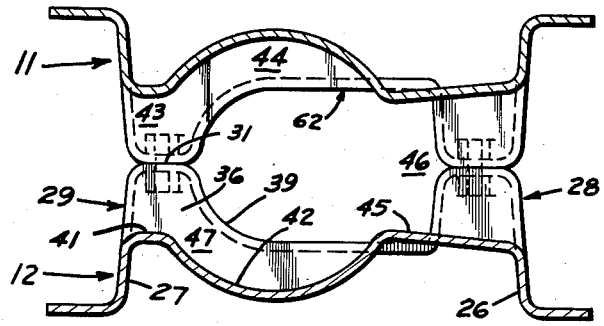
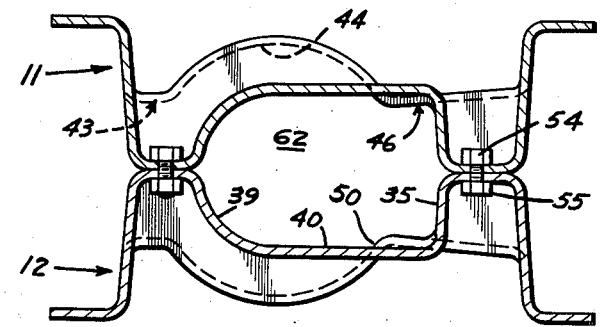
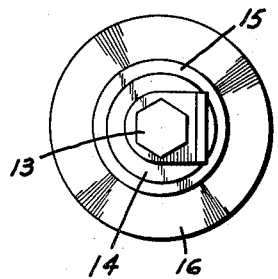
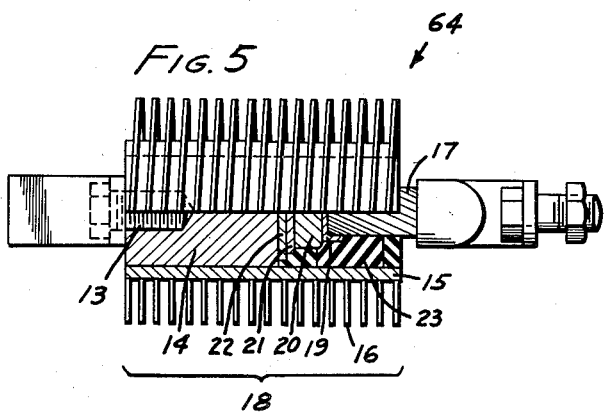
INVENTOR.
EDWARD J. DIEBOLD
BY D. Gordon Angus
ATTORNEY.

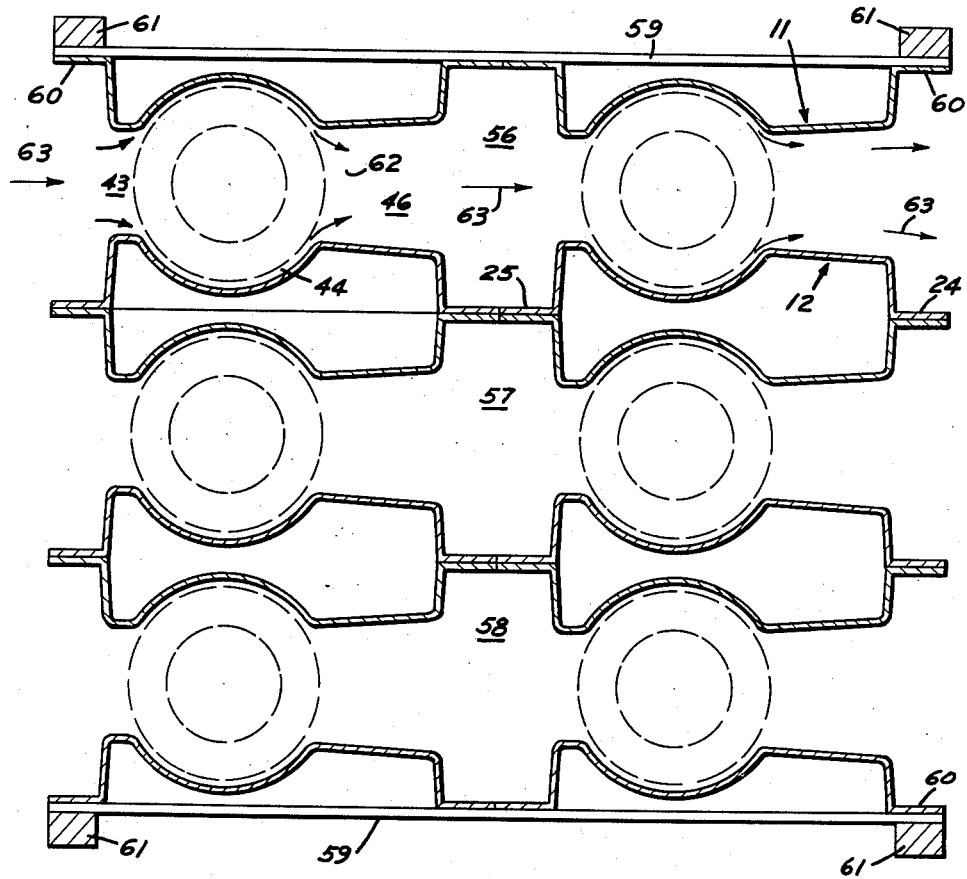

United States Patent Office 2,842,722
Patented July 8, 1958

2,842,722

RECTIFIER MOUNTING DEVICE

Edward J. Diebold, Palos Verdes Estates, Calif., assignor to International Rectifier Corporation, El Segundo, Calif., a corporation of California Application March 4, 1957, Serial No. 643,637

17 Claims. (Cl. 317—234)

This invention relates to means for mounting and cooling current rectifiers.

The dissipation of the large amounts of heat produced in the operation of high current rectifiers is a problem of long standing. One known means for this dissipation has been the use of cooling fins to produce large heat-transfer areas. However, such means left unsolved the problem of securing an effective coolant flow over the fins, and of mounting the finned rectifiers. An object of this invention is to provide a housing structure for rectifiers which may be produced economically and which provides an envelope that directs moving streams of coolant fluid in such a manner that the rectifiers are efficiently cooled.

This invention is carried out with the use of a housing that forms a cavity therein for receiving and holding the rectifiers which are to be mounted. A feature of the invention resides in providing inlet and outlet conduits in fluid communication with said cavity so that coolant can flow through said conduits and over the surfaces of the rectifier to cool the rectifier.

A related but optional feature of the invention resides in providing the aforesaid outlet conduit in the form of a passage which expands in the direction of coolant flow away from said rectifier so as to minimize turbulence in coolant flow over the finned rectifiers. A non-turbulent flow, wherein the pressure drop over the fins is principally due to friction therewith, provides an optimum cooling effect.

These and other features of this invention will be fully understood from the following detailed description and accompanying drawings of which:

Fig. 1 is a perspective view of a housing structure in accordance with the present invention;

Fig. 2 is a cross-section taken at line 2—2 of Fig. 1;

Fig. 3 is a cross-section taken at line 3—3 of Fig. 1;

Fig. 4 is an end view of a type of crystal-type rectifier which can advantageously be mounted in the device of Figs. 1–3;

Fig. 5 is a side elevation, partly in cross-section, taken at line 5—5 of Fig. 4; and Fig. 6 is a schematic cross-section showing an arrangement of a plurality of housing structures in accordance with the present invention.

In Figs. 1 to 3 there is shown a rectifier housing 10 comprising two half shells 11 and 12. The position and shape of one type of crystal rectifier with which this housing can be advantageously used is shown in phantom line, and the two exemplary rectifiers are denoted by numerals 64 and 65 in Fig. 1. These two rectifiers are shown connected together electrically. The outer peripheries of the fins on these rectifiers are helixes, rendering the rectifiers substantially a circular cylinder in configuration (see Fig. 4).

In Figs. 4 and 5 there is shown an end view of rectifier 64, it being understood that rectifier 65, and any other rectifiers used in this device, may be of the same construction. This rectifier has a positive terminal bolt 13, a conductive base plug 14, a tubular enclosure 15 and a spiral cooling fin 16. A negative terminal lead 17 enters one end of the tubular enclosure. The cooling fin has a plurality of helical (spiral) turns 18. A cable butt plate 19, an electrode 20, a germanium wafer 21 and a base plate 22 are assembled in conducting relationship. The electrode 20 and the base plate 22 are soldered to opposite sides of the germanium wafer 21. A suitable insulation 23 is provided around the negative terminal lead 17, the cable butt plate 19, the electrode 20, the germanium wafer 21 and the base plate 22. This insulation may be an epoxy resin poured into the enclosure.

In Fig. 1, the lower half shell 12 is shown provided with two end flanges 24 and 25. Walls 26 and 27 extend upward from the flanges 24 and 25 respectively. Spacing posts 28 and 29 rise above the walls 26 and 27 respectively, to equal elevations where they have flat upper surfaces 30 and 31 respectively. The spacing post 28 has small side walls 32 and 33 and larger end walls 34 and 35. The end wall 34 is an extension of the wall 26 which extends upward from the flange 24. The spacing post 29 has side walls 36 and 37 and end walls 38 and 39. The side walls 36 and 37 are substantially at the same relative positions as the side walls 32 and 33 respectively, of the spacing post 28 on the opposite end of the half-shell 12. The end wall 38 is an extension of the wall 27 which extends upward from flange 25. The end wall 39 extends downward and changes directions in such a manner that its direction at its terminus is nearly horizontal, at which point a flat land 40 extends substantially horizontally to the wall 35 of the spacing post 28.

At the upper edge of the wall 27, an upward convex surface 41 intersects a rectifier cavity surface 42 at an elevation which is less than the elevation of the upper surface 31 of the spacing post 29. The upward convex surface 41 is provided so that it forms one surface of an inlet conduit 43 to a rectifier cavity 44, as best shown in Fig. 2.

A surface 45 slants upward and to the left from the wall 26 at an angle of about 5 degrees from the horizontal. The surface 45 is preferably planar over substantially its entire length and may extend any suitable distance to the left that is required for a particular size rectifier.

The slanting surface 45 is provided so that it forms one surface of a venturi type nozzle outlet conduit 46 extending from the rectifier cavity 44, as best shown in Fig. 2. The slanting nozzle surface 45 extends upward and inward to the left so that it intersects the rectifier cavity surface 42 at substantially the same elevation as the maximum elevation of the curved surface 41.

The rectifier cavity surface 42 has a concave shape corresponding to a portion of the peripheral configuration of the rectifiers used, in this case, a portion of a circular cylinder.

The side wall 36 of the spacing post 29 extends downward from both the upper surface 31 and the end wall 39 to form a partial end 47 for the rectifier cavity 44.

Holes 48 and 49 pass through the upper surfaces of the spacing post 28 and 29 respectively.

It will be recognized that the concave surface 42 which receives the rectifier, the first depressed surface which forms with its adjacent side walls an inlet conduit 43, and the second depressed surface which forms with its adjacent side walls an outlet conduit 46, are all disposed in one face of the shell 12 which forms a mounting structure. Shell 11 has a surface which opposes (i. e. faces toward) the extended face of shell 12, and the two faces are mirror images of each other; in effect, one is a left hand and the other is a right hand part.

The cavity and conduits are duplicated as many times as desired to accommodate as many rectifiers as are desired to be mounted. Cavity 50, for example, illustrates a use of a second cavity for mounting a second rectifier in the housing, and of course any number of additional cavities and conduits could be provided.

The shells are brought into abutment to mount the rectifiers, and surfaces 30 and 31 are typical of abutment surfaces for this purpose. They save also to restrict the flow of coolant to the desired channels.

In a forward direction of view from the rectifier cavity surface 42, an electrically-conductive prong 51 is shown attached to the positive terminal bolt 13 of the rectifier 64. The prong 51 extends from the rectifier and protrudes beyond the edge of the half shells 11 and 12 of the rectifier housing structure.

In the rearward direction of view beyond the portion of the housing structure with the rectifier cavity surface 50, a rectifier negative terminal lead 17 is attached to a teminal bolt 52. The terminal bolt 52 passes through an end closure 53 which closes the end of the structure when it is assembled. The terminal bolt 52 protrudes beyond the edge of the half shells 11 and 12 and it is provided with a nut to hold it in a position through a hole in the center of the circular portion of the end closure 53. The upper half shell 11 of the rectifier housing 10 is a mirror image of the lower half shell 12 and has similar surfaces and members. Clamping shells 11 and 12 together therefore make a symmetrical structure. Bolts 54 are placed through the bolt holes such as 48 and 49 in the upper and lower half shells 11 and 12 and fastened with nuts 55 to hold the rectifier housing 10 together.

Six such rectifier housings as described above, each including shells 11 and 12, are shown in a stacked arrangement in Fig. 6 attached to support plates 59 adjacent to each other at their flanges 24 and 25. This arrangement forms three chambers 56, 57 and 58 between each two rectifier housings which are aligned with one another. Support plates 59 are attached to flanges 60 which comprise the four outer flanges of the rectifier housing stack comprising the six rectifier housings. Support brackets 61 are welded to the two outwardly located plates 59 so that convenient attachment may be made to other structures.

In Fig. 2 there is shown the inlet conduit 43 formed between the convex surface 41 and its mirror image on the half shell 11, the rectifier cavity 44 formed between the concave surface 42 and its mirror image on the half shell 11 and the venturi conduit outlet 46 formed between the slanting surface 45 and its mirror image on the half shell 11.

In Fig. 3 there is shown a chamber 62 formed between the end wall 39, the horizontal land 40, and the end wall 35 and their respective mirror images on the half shell 11. The chamber 62 is partly adjacent to both the rectifier cavity 44 and the venturi outlet conduit 46 as shown in Figs. 2 and 3.

The purpose of the chamber 62 is to provide space for the high current capacity electrical connections between the rectifiers such as 64 and 65. Similar chambers will be provided between adjacent cavities, and are preferably also provided at the opposite ends of each of the end cavities in order to receive and pass the electrical connections to the rectifiers from the outside of the housing. A small flow of coolant through these chambers cools the connections.

The conduits 43 and 46, the rectifier cavity 44 and the chambers provide the passageways for the coolant fluid which is caused to flow through the rectifier housing.

The half shells 11 and 12 are preferably die-cast into a substantially rigid structure of uniform gauge. A convenient material is glass fiber matting about 1/16 inch thick, cast in a polyester resin to form a structure about 0.040 inch thicker.

Although a rectifier housing 10 with an outlet conduit 46 having opposing sides 45 which flare apart to form a dihedral angle of about 10° has been described, it will be appreciated that other angles may be used. The opposing sides 45 for the outlet conduit 46 may be parallel to one another, or may flare out as desired. A diheldral angle between the surface 45 and its mirror image of about 10° is preferred.

The opposing half shells 11 and 12 when assembled provide a sandwich-like arrangement for holding rectifiers, particularly finned rectifiers utilizing germanium or silicon crystals for rectification of the type shown in Figs. 4 and 5. These rectifiers often carry substantial amperage, for example 150 amperes.

The spacing posts 28 and 29 may have any suitable opposing upper surfaces such as 30 and 31, the main purpose of the spacing posts being to hold the half shells 11 and 12 apart in fixed relationship. The rectifiers are provided with alternating current which they rectify to D. C. current. The heat resulting from rectifier operation must be dissipated to prevent damage to the rectifiers. A moving fluid supply such as air, represented by the arrows 63 in Fig. 6, is provided to cool the rectifiers contained in the housing shells. Coolant air passes through the inlet conduit 43 then through the rectifier cavity and central chamber 44 and 62, respectively. Heat is transferred to the coolant fluid from the fins. The venturi type conduit assures a non-turbulent flow over the fins. Therefore coolant pressure drop across the fins is largely due to friction losses. This type of coolant flow has been found to give optimum heat transfer, whereas turbulent flow results in cooling at a lower efficiency.

The cooled expanded air or other fluid from the outlet conduit 46 then passes into a chamber such as the chamber 56 formed between flanges on adjacent rectifier housings. The air from a chamber such as 56 then passes to the next housing to cool the next rectifier in its cavity.

One advantage of this housing is its economy of production and assembly, once a die has been made for its manufacture. It can be turned out in large quantities at low cost per unit, and it is easy to assemble because the preferred embodiment requires only two opposing formed members. The rectifiers are securely held and are adequately cooled by both radiation from the cooling fin 16 and the half shells 11 and 12 and also by the non-turbulent flow of the air or other suitable gas or fluid which removes the excess heat. End wall, such as 47, prevent the rectifiers from sliding lengthwise. The structure is also strong and substantially rigid without additional braces since the corrugations provide a strong self-braced structure.

The preferred embodiment shown and described comprises two mirror-image half shells although it is evident that it is still within the scope of this invention to provide all cavities and inlets and outlets in the section which is closed by a cover. Other similar adaptations of this invention might also be designed by persons skilled in the art.

Although only the preferred embodiment of this invention has been shown and described, it is my desire that the invention shall not be limited to the above specific embodiment, but only in accordance with the appended claims since persons skilled in the art may devise other forms still within the limitations of the claims.

I claim:

1. A rectifier housing for mounting current rectifiers, said rectifier housing comprising: a housing structure having a plurality of cavities for holding said rectifiers, said housing structure having an inlet conduit and an outlet conduit for each of said cavities, one of said inlet conduits and one of said outlet conduits being in fluid communication with each other through each of said cavities, and means covering said cavities and conduits, whereby rectifiers may be contained in said cavities in electrical connection with one another for purposes of electrical rectification of current provided thereto, and whereby a coolant fluid may be passed through said inlet conduits, into said cavities, around said rectifiers contained therein, and then out through said outlet conduits, heat generated by said rectifiers being transferred to said coolant fluid, thereby cooling said current rectifiers.

2. Apparatus according to claim 1 in which said cavities have surfaces which are fragments of circular cylinders so as to hold firmly rectifiers having fin cooling means of a cylindrical peripheral configuration.

3. Apparatus according to claim 1 in which the cross-sectional areas of all of the inlet conduits at their intersection with their respective cavity are substantially equal.

4. Apparatus according to claim 1 in which the area of the cross-section of each of said outlet conduits increases with the distance of said cross-section away from the cavity.

5. Apparatus according to claim 1 in which said housing structure and said means for covering said cavities and conduits are mirror images of each other.

6. A rectifier housing for mounting current rectifiers which have electrical connections to one another, said rectifier housing comprising: a housing structure having a plurality of cavities for holding said rectifiers, an inlet conduit and an outlet conduit for each of said cavities, one of said inlet conduits and one of said outlet conduits being in fluid communication with each other through each of said cavities, said housing structure having a chamber interconnecting a pair of adjacent cavities; means covering said housing structure closing said cavities, inlet conduits, outlet conduits and chamber, whereby rectifiers disposed in said cavities may be connected in electrical communication with one another by means of electrical connections which pass through said chamber, whereby a coolant fluid may be passed through each of said inlet conduits, through said cavities and around said rectifiers, and out through said outlet conduits, heat from said rectifiers being transferred to said coolant fluid, thereby cooling said current rectifiers.

7. A housing for mounting a current rectifier comprising a pair of shells adapted to be drawn into abutment to hold said rectifier between faces of the shells which oppose each other, each shell having on its respective face a concave surface, a first depressed surface and a second depressed surface, said depressed surfaces intersecting said concave surface, whereby when the two shells are placed opposite one another, the concave surfaces of the two shells form a cavity for receiving and holding said rectifier, said first depressed surface of the two shells form an inlet conduit in fluid communication with said cavity, and said second depressed surfaces of the two shells form an outlet conduit in fluid communication with said cavity, thereby providing inlet and outlet conduits in fluid communication with said cavity through which a coolant fluid may be passed to cool the rectifier.

8. Apparatus according to claim 7 in which the area of the cross-section of said outlet conduit increases with the distance of said cross-section away from the cavity.

9. Apparatus according to claim 7 in which said rectifier housing is of glass fiber material reinforced with a polyester resin.

10. Apparatus according to claim 7 in which said second depressed surfaces are more deeply depressed as they extend away from the concave surface.

11. Apparatus according to claim 10 in which each of said second depressed surfaces is substantially a plane.

12. A housing for mounting a current rectifier comprising: a pair of shells adapted to be drawn into abutment to hold said rectifier between faces of the shells which oppose each other and are mirror images of each other, each shell having on its respective face a concave surface, a first depressed surface and a second depressed surface, a third depressed surface, and a fourth depressed surface each of said depressed surfaces intersecting said concave surface, whereby when the two shells are placed opposite one another, the concave surfaces of the two shells form a cavity for receiving and holding said rectifier, the first depressed surfaces of the two shells form an inlet conduit in fluid communication with said cavity, the second depressed surfaces of the two shells, form an outlet conduit in fluid communication with said cavity, and said third and fourth depressed surfaces of the two shells form chambers which intersect said cavity, whereby inlet and outlet conduits in fluid communication with said cavity are formed through which a coolant fluid may be passed, and whereby chambers are formed adjacent to the cavities for accommodating means for electrically connecting said rectifier in a circuit.

13. Apparatus according to claim 12 in which each shell has a pair of flanges thereon, one flange being on a side adjacent to the inlet conduit and the other flange being on a side adjacent to the outlet conduit.

14. Apparatus according to claim 13 in which said two flanges are each provided with bolt holes so that said housing may be attached to other structures.

15. Apparatus according to claim 13, in which a plurality of said shells, placed with their flanges adjacent to each other, are disposed so that the outlet conduit of one housing discharges into the inlet conduit of another housing.

16. Apparatus according to claim 15 in which said plurality of housings are disposed with the outlet conduit which discharges into an inlet conduit spaced from said inlet conduit.

17. In combination: a current rectifier having a cathode terminal member, an anode terminal member and a cooling fin; and a housing for mounting said current rectifier comprising a pair of shells adapted to be drawn into abutment to hold said rectifier between faces of the shells which oppose each other, and are mirror images of each other, each shell having on its respective face a concave surface, a first depressed surface and a second depressed surface said depressed surfaces intersecting said concave surface, whereby when the two shells are placed opposite one another, the concave surfaces of the two shells form a cavity, said current rectifier being placed within the said cavity with the concave surfaces bearing on the fin, said first depressed surfaces of the two shells form an inlet conduit in fluid communication with said cavity, and said second depressed surfaces of the two shells form an outlet conduit in fluid communication with said cavity, thereby providing inlet and outlet conduits in fluid communication with said cavity through which a coolant fluid may be passed over the fin to cool the rectifier.

References Cited in the file of this patent

UNITED STATES PATENTS

| | | |
|---|---|---|
| 1,718,663 | Ogden | June 25, 1929 |
| 1,738,113 | Ogden | Dec. 3, 1929 |
| 2,780,757 | Thornhill et al. | Feb. 5, 1957 |